No. 668,427. Patented Feb. 19, 1901.
W. H. UHLAND.
APPARATUS FOR MAKING STARCH.
(Application filed Aug. 28, 1899.)
(No Model.)

Witnesses:
J. W. McMahon.
L. M. Shireman.

Inventor,
Wilhelm Heinrich Uhland
by B. Singer Att'y.

THE NORRIS PETERS CO., PHOTO-LITHO., WASHINGTON, D. C.

UNITED STATES PATENT OFFICE.

WILHELM HEINRICH UHLAND, OF LEIPSIC, GERMANY.

APPARATUS FOR MAKING STARCH.

SPECIFICATION forming part of Letters Patent No. 668,427, dated February 19, 1901.

Application filed August 28, 1899. Serial No. 728,763. (No model.)

*To all whom it may concern:*

Be it known that I, WILHELM HEINRICH UHLAND, a subject of the King of Saxony, residing at Leipsic-Gohlis, in the Kingdom of Saxony, German Empire, have invented certain new and useful Improvements in Apparatus for Separating Starch from the Milk, of which the following is a specification.

My invention has for its object to facilitate the concentration of the starch and its separation from the starch-milk or starch-water and residual impurities. To this end I propose to employ a settling-tank and accessory apparatus so constructed and combined that the starch-water, being introduced from above, shall be conducted with gradual diffusion to a point beneath the surface of the liquid already within the tank and thence gently deflected upward, so as to rise slowly toward the top, precipitating the starchy particles on the way and carrying with it the lighter impurities to pass off in the overflow.

Figure 1:
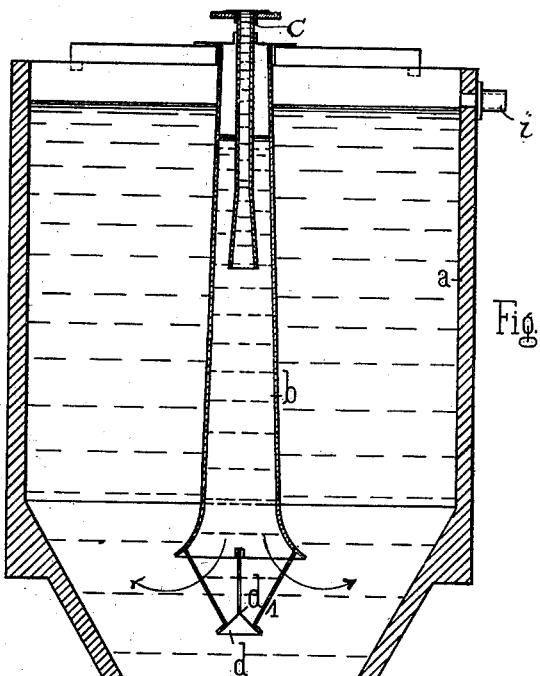
Figures 3, 4:
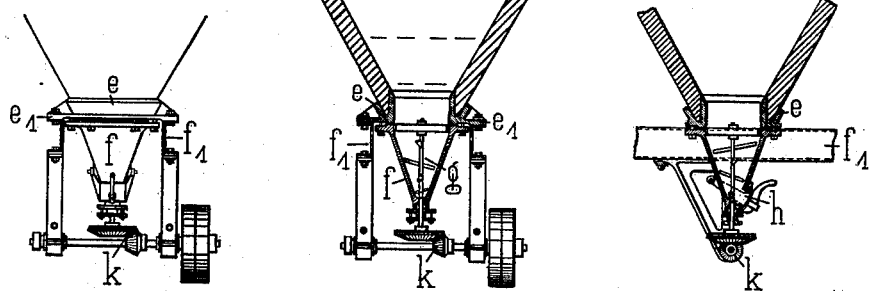
Figure 2:
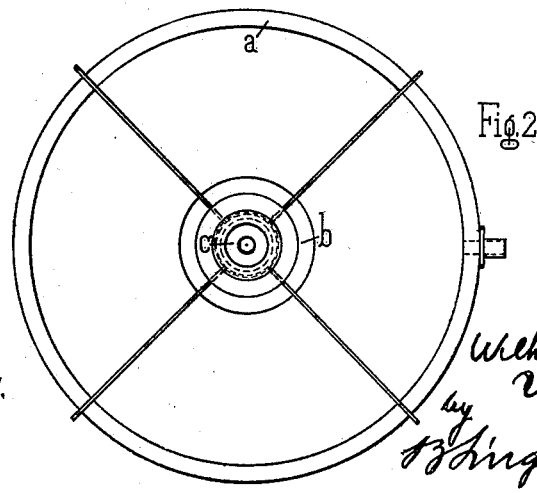

In the drawings, Figure 1 is a vertical central section through apparatus embodying my invention, and Fig. 2 is a top plan view of said apparatus.

The tank or receptacle $a$ may be of any suitable outline in cross-section, herein being shown as cylindrical, which is in some respects the most desirable form, and may have a height and width most consonant with the strength or nature of the starch solution to be treated. For the purpose of this description it will be assumed that this tank is already filled and in action. The solution of raw starch or starch-milk containing suspended impurities—such as fibers, albuminous flakes, and the like—and dissolved impurities—such as coloring substances, salts, proteins, and the like—enters the apparatus through the centrally-arranged vertical pipe $c$, which widens or flares toward its lower end and is located in a concentric wider and longer pipe $b$, flaring still more toward its foot, which is a considerable distance below the foot of the first-named pipe. The pipe $c$ dips into the liquid in the receptacle about one-third or one-half meter to prevent the inflowing solution from coming into contact with the air and to avoid shocks that might result from the transmission of the greater velocity of the solution to the mass of liquid within the tank, as well as to make such transmission gradual. The force or velocity of the incoming solution is decreased by the increasing diameter of the pipe $c$ toward its foot, that increase being enhanced still more in the pipe $b$ by reason of the corresponding flare in the latter below the point where pipe $c$ discharges therein. The starch milk or solution thus passes from the pipe $b$ into the vessel or tank $a$ with a very slow current, that current being, in fact, so slow that the movement of the particles of starch caused by gravitation and which is in one direction with the solution greatly surpasses the speed of the current, so that consequently a certain concentration is already brought about in the lower part of the tank. Below the pipe $b$ and in close proximity thereto is located an inverted cone $d$, having its apex $d'$ in axial line with the two inlet-pipes. By this bell the starch solution issuing from the lowermost pipe is deflected, as indicated by the arrows, radially outward and upward, and, as it were, in an unbroken film circumferentially around the edge of the bell. The current is thereby diffused and its speed still more decreased, permitting the particles of starch held in suspension to settle down upon the bottom of the tank. The largest and heaviest particles precipitate first, of course, the lighter particles following. The upper part of the liquor in the tank will thus retain but a certain minimum of the lighter particles of the starch, but will contain all the solved impurities, as well as fibers and the like, which remain suspended in the liquor and are carried off through the overflow $i$ therewith.

The bottom of the tank is concave and at its apex opens into a narrowed or constricted cylindrical chamber $e$, which terminates in a prolonged cone $f$. Brackets $e'$ from the casing of chamber $e$ rest upon beams $f''$ and support the apparatus. Within the conical chamber $f$ is arranged an agitator $g$, driven by suitable gearing $k$ and intended to prevent the starch from caking or forming a more or less solid deposit. A spout $h$ is arranged in the side of the conical chamber to draw off the concentrated starch as may be required.

I claim—

1. In a tank for separating starch, the combination of a centrally-arranged upright induction-pipe having flaring discharge at its foot, and the inverted deflecting-cone immediately beneath said discharge, having its apex in axial line with said pipe.

2. In a tank for separating starch, the combination of the primary induction-pipe flaring toward its lower end, the exterior concentric pipe extending beyond the first and also flaring toward its foot, and the inverted deflecting-cone immediately beneath the latter pipe.

In witness whereof I have hereunto set my hand in presence of two witnesses.

WILHELM HEINRICH UHLAND.

Witnesses:
 RUDOLPH FRICKE,
 B. H. WARNER, Jr.